United States Patent [19]

Birbragher

[11] Patent Number: 4,759,513
[45] Date of Patent: Jul. 26, 1988

[54] NOISE REDUCTION NACELLE
[75] Inventor: Fernando Birbragher, Miami, Fla.
[73] Assignee: Quiet Nacelle Corporation, Miami, Fla.
[21] Appl. No.: 911,994
[22] Filed: Sep. 26, 1986
[51] Int. Cl.⁴ .............................................. B64D 33/02
[52] U.S. Cl. .................................. 244/1 N; 244/53 B; 181/222; 181/292
[58] Field of Search .................. 244/53 R, 1 N, 53 B; 181/213, 214, 222, 256, 258, 290, 292, 294, 284

[56] References Cited
U.S. PATENT DOCUMENTS 3,481,427 12/1969 Dobbs et al. ........................ 181/292
3,502,171 3/1970 Cowan .................................. 181/292
4,235,303 11/1980 Dhoore et al. ...................... 181/214

Primary Examiner—Joseph F. Peters, Jr.
Assistant Examiner—Rodney Corl
Attorney, Agent, or Firm—Oblon, Fisher, Spivak, McClelland & Maier

[57] ABSTRACT

A noise reduction nacelle for a jet engine having an inlet duct, a center body and at least one exit duct and which includes a composite sandwich panel positioned in the inlet duct, the center body and the at least one exit duct. The panel includes an inner face sheet, a honey comb core and an outer face sheet wherein the inner face sheet and the outer face sheet are connected to the inner and outer surfaces, of the core. A plurality of perforations are provided in the inner face sheet of a predetermined density and wherein each of the perforations is of a predetermined diameter. A method of forming the composite sandwich panel is also provided.

19 Claims, 3 Drawing Sheets

NOISE REDUCTION NACELLE

BACKGROUND OF THE INVENTION

1. Field of the Invention

The present invention relates to a noise reduction nacelle for jet aircraft for absorbing high frequency harmonics produced by the high speed air flow exhausted from the primary fan nozzles and by dampening noise generated by fan air and rotating stages of the engine wherein the noise reduction is accomplished by installation of an acoustically treated engine inlet, center body and bifurcated duct.

2. Description of the Backqround

The existing nacelles for various types of jet aircraft is exemplified by FIG. 1 which serves to illustrate a nacelle 1, an engine inlet duct 2, a center body 4 and a fan-exhaust duct 6. An engine of this type typically includes a fan-exhaust thrust reverser 8 shown in a stowed position or can be operated to provide a fan-exhaust thrust reverser 10 in an extended position. Aircraft of this type have difficulty in complying with current noise restrictions and it has therefore become important that noise reduction for compliance with Federal regulations be provided without requiring significant engine modifications and while maintaining the economy and profitability of the aircraft itself. More particularly, it is important that no modifications be required to the engine nacelle cowling. In addition, the pan panels and venetian blinds should remain as originally manufactured and there should be no required changes to the cascade and aft reversers. In addition, the inlet cowl and bullet (i.e. center body 4) should be where possible identical in size to the original equipment.

SUMMARY OF THE INVENTION

In light of the drawbacks of the prior art engine, an object of the present invention is to provide for a noise reduction nacelle which can be utilized, for example, by the DC8-50/61 series aircraft and which does not required engine modification and, moreover, maintains the economy and profitability of such aircraft.

A further object of the noise reduction nacelle of the present invention is to allow the aircraft engine to be in compliance with the Federal Noise Regulations such as, for example, FAR 36 Stage 2 and ICAO Annex 16-2.4.1 and 2.4.2 noise regulations.

The noise reduction nacelle of the present invention serves to bring the aircraft in compliance with current noise regulations by absorbing high frequency harmonics produced by the high speed airflow exhausted from the primary fan nozzles and by dampening noise generated by fan air and rotating stages of the engine. This is accomplished by installing an acoustically treated engine inlet, center body and bifurcated duct.

A further object of the present invention is to provide a noise reduction nacelle which does not require modifications to the engine nacelle cowling and wherein fan panels have venetian blinds remain as manufactured and that there is no need to change the cascade and aft reversers. In addition, the inlet cowl and bullet (center body) are capable of being identical in size to the original engine equipment.

In accordance with the present invention, the inlet cowl is capable of being overhauled and modified with an acoustically treated interfacing such that the acoustical engine inlet retains a significant amount of existing hardware for full interchangeability. The center body is capable of being remanufactured utilizing acoustical materials and is also fully interchangeable with existing hardware.

In accordance with the present invention, a noise reduction nacelle for a jet engine is provided and which includes an inlet duct, a center body and at least one exit duct and further includes a composite sandwiched panel positioned in the inlet duct, the center body and at least one exit duct, the panel including an inner face sheet, a honey comb core and an outer face sheet wherein the inner face sheet and the outer face sheet are connected to inner and outer surfaces, respectively, of said core.

A further object of the present invention is to provide a noise reduction panel as described above and to provide a method for forming a noise reduction nacelle having an inlet duct, a center body and at least one exit duct, which includes the step of forming a composite panel which includes an inner face sheet, a honey comb core and an outer face sheet wherein the inner face sheet and the outer face sheet are connected to inner and outer surfaces, respectively of the core, the inner sheet having a plurality of perforations of a predetermined density and wherein each perforation is of a predetermined diameter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
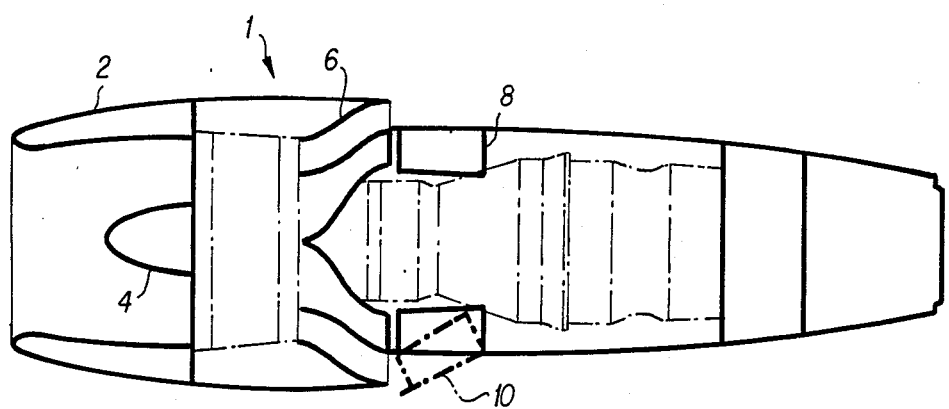
FIG. 1 discloses a conventional engine nacelle.
Figure 2:
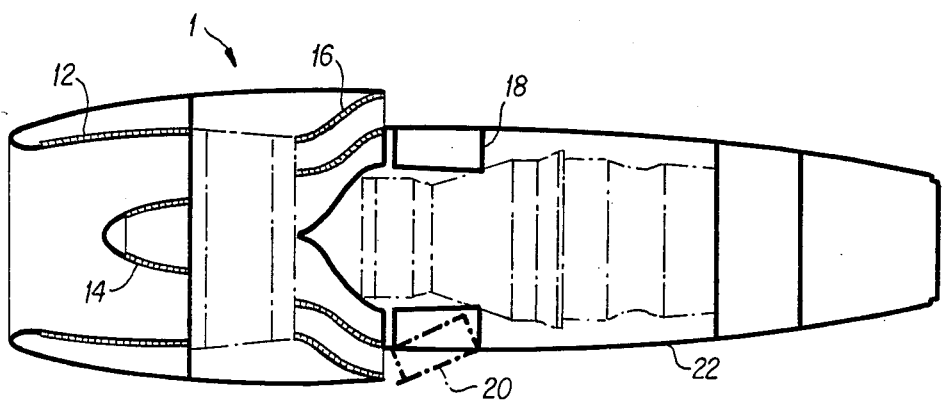
FIG. 2 illustrates a modified nacelle in accordance with the present invention.

The noise reduction nacelle in accordance with the present invention is indicated by reference number 1 in FIG. 2 wherein illustrated therein is an inlet duct acoustical treatment 12, a center body acoustical treatment 14 and a bifurcated fan air exit duct exhaust treatment 16 of the inner and outer walls. Also illustrated is a fan-exhaust thrust reverser 18 in a stowed condition and a fan-exhaust thrust reverser 20 in an extended condition. An existing aft cowling 22 is also illustrated.

Figure 3:
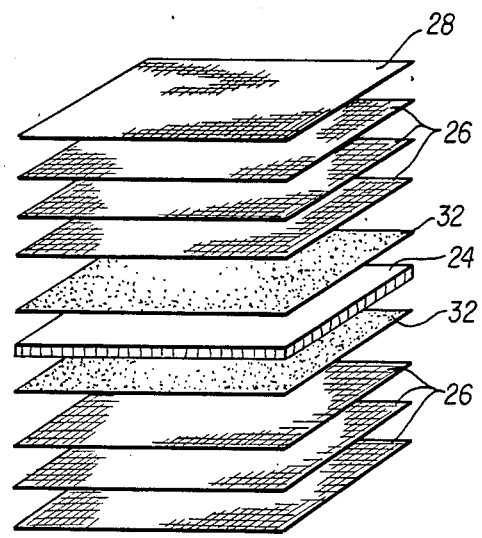
FIG. 3 shows the structural acoustical sandwich panel utilized in the inlet duct and center body.
Figure 4:
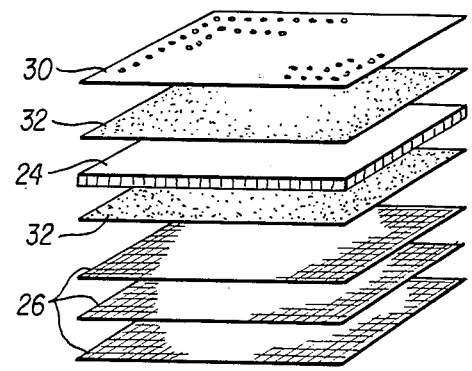
FIG. 4 indicates the structural acoustical sandwich panel utilized in the fan-exhaust duct.

All of the acoustical treatments are in the form of structural sandwich panels that consist of three basic elements, these being a perforated inner face sheet, a honey comb core and an outerface sheet. The three elements are bonded together by a film adhesive. The typical sandwich panel for the inlet duct and center body is illustrated in FIG. 3 while that utilized for the fan exhaust duct is shown in FIG. 4. which includes a 0.5 perforated aluminum sheet 30. Illustrated in FIG. 3 is a NOMEX ARAMID honey comb core 24 wherein the area of each honey comb is 0.75 square inches, a preimpregnated graphite fabric 26, fiberglass fabric 28, and an adhesive film 32.

Figure 5:
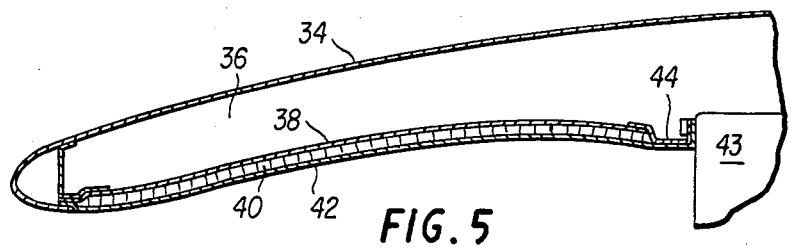
FIG. 5 shows the details of the acoustical sandwich panel positioned in the inlet duct.
Figure 6:
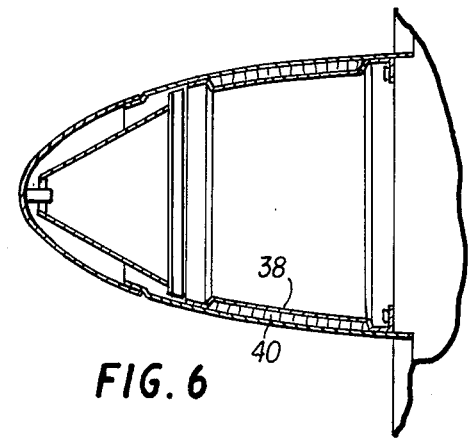
FIG. 6 shows the location of the acoustical sandwich panel located in the center body.
Figure 7:
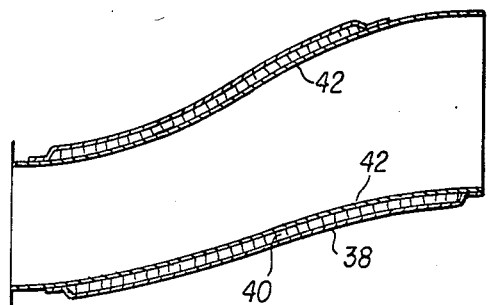
FIG. 7 shows the acoustical panel installed in the fan-exhaust duct of the engine.

As illustrated in FIGS. 5 and 6, the acoustical composite sandwich panel shown in FIG. 3 is mounted in the inlet duct and center body. Reference numeral 34 designates a 0.80 aluminum alloy skin while reference numeral 36 indicates an open area having a wall of Intercostal 0.063 aluminum alloy. An outer face sheet 38 is connected to a ¾ inch thick honey comb 40 while the inner face sheet 42 is perforated with openings or apertures 1/16th inch in diameter. After the inner face sheet, honey comb and outer face sheet have been bonded together using the film adhesive, the inlet duct and center body are cured at 350° F. to 450° F. (preferably 350° F.) followed by perforation of the inner face sheet with the 1/16th inch diameter holes of a density of 72 holes per square inch pattern. The result for both the inner and outer face sheet is a 32% opening area per square inch but it has been found that a range of 22% to 38% open area per square inch can be utilized. Engine 43 and existing ring 44 are also illustrated in FIG. 5.

With respect to the construction of the fan-exhaust duct, it is possible to modify the existing duct to accommodate the new panel for the fan-exhaust duct. This modification consists of removing all structural reinforcements and substituting the panel which has been perforated with 1/16 inch diameter holes utilizing 72 holes per square inch pattern. The panel utilized in this environment is as shown in FIG. 4 and as discussed above.

The construction of the panels and the use of the above-noted holes serves to provide both fire resistant characteristics and noise reduction. It is to be further noted that with respect to securing the acoustical panels to, for example, the inlet duct, rings can be used to secure the same in place or other conventional securing elements.

Test results utilizing the foregoing acoustical panel have indicated a significant reduction in noise so as to allow for modification of existing aircraft engines so as to comply with Federal Aviation Regulations. It is to be noted that the perforated pattern hole size and material layering sequence vary depending upon harmonic frequencies to be absorbed and structural strength requirements for each modified component.

As can be appreciated, the advantages of the present invention are that such allow for compliance with Federal noise regulations and result in a jet engine which has a weight equivalent to the original configuration. In addition, no internal engine modifications are required and instead such are necessary only for the engine nacelle. In addition, completely interchangeable hardware can be used, field installation is possible and component exchangeability is obtained.

It is to be further noted that with respect to the preimpregnated graphite fabric, Ciba-Giegy preimpregnated graphite fabric can be utilized.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A noise reduction nacelle for a jet engine, having an inlet duct, a center body and at least one exit duct, comprising:
   a composite sandwich panel positioned in said inlet duct, said center body and said at least one exit duct for absorbing high frequency harmonics produced by high speed air flow and for dampening noise generated by said engine wherein said panel consists of an inner face sheet, a honey comb core, an outer face sheet and an adhesive sheet positioned between at least one of said inner and outer face sheets and said honey comb core wherein said inner face sheet has a plurality of perforations formed therein and said perforations comprise an open area of 22-38%.

2. A noise reduction nacelle as set forth in claim 1, wherein said inner face sheet comprises at least one layer of fiberglass fabric and at least one layer of graphite fabric.

3. A noise reduction nacelle as set forth in claim 2, wherein said at least one layer of graphite fabric of said inner sheet further comprises preimpregnated graphite fabric.

4. A noise reduction nacelle as set forth in claim 3, wherein said at least one outer face sheet further comprises a first, second and third layer of preimpregnated fabric.

5. A noise reduction nacelle as set forth in claim 1, wherein said inner face sheet includes a plurality of perforations formed therein.

6. A noise reduction nacelle as set forth in claim 1, wherein said honey comb has a thickness of 0.75 inches.

7. A noise reduction nacelle as set forth in claim 1, wherein said perforations of said inner sheet are of a density of 72 holes per square inch and wherein each of said perforations is of a diameter of 1/16 inch.

8. A noise reduction panel, comprising a composite sandwich panel which consists of an inner face sheet, a honey comb core, an outer face sheet and an adhesive sheet positioned between at least one of said inner and outer face sheets and said honey comb core wherein said inner face sheet and said outer face sheet are connected to inner and outer surfaces, respectively of said core and wherein at least one of said sheets comprises at least one layer of preimpregnated graphite fabric wherein said inner face sheet includes a plurality of perforations formed therein which comprises an open area of 22-38%.

9. A noise reduction panel as set forth in claim 8, further comprising a film adhesive for bonding said inner face and outer face sheets to said honey comb core.

10. A noise reduction panel as set forth in claim 9, wherein said inner face sheet comprises at least one layer of fiberglass fabric and at least one layer of graphite fabric.

11. A noise reduction panel as set forth in claim 10, wherein said at least one layer of graphite fabric of said inner face sheet further comprises preimpregnated graphite fabric.

12. A noise reduction panel as set forth in claim 11, wherein said at least one sheet further comprises first, second and third layers of preimpregnated fabric.

13. A noise reduction panel as set forth in claim 8, wherein said perforations in said inner sheet are of a density of 72 holes per square inch and wherein each of said perforations is of a diameter of 1/16 inch.

14. A noise reduction panel as set forth in claim 8 wherein said upper sheet comprises a fiberglass fabric sheet and at least one graphite fabric sheet and said outer sheet comprises at least one graphite fabric sheet.

15. A noise reduction panel as set forth in claim 8, wherein said inner sheet comprises a metal sheet and said outer sheet comprises at least one graphite fabric sheet.

16. A method of forming a noise reduction nacelle for a jet engine having an inlet duct, a center body and at least one exit duct, which comprises:
    forming a composite panel consisting of an inner face sheet, a honey comb core, an outer face sheet and an adhesive sheet positioned between at least one said inner and outer face sheets and said honey comb core wherein the inner face sheet and the outer face sheets are connected to inner and outer surfaces, respectively of the core;
    positioning said composite panel in said inlet duct, said center body and said at least one exit duct;
    forming a plurality of perforations in said inner sheet after positioning of said composite panel in said inlet duct, said center body and said at least one exit duct so as to form perforations of a density of 72 holes per square inch wherein each of said perforations of a diameter 1/16 inch and wherein said perforations comprise an open area of 22-38%

17. A method of forming a noise reduction nacelle as set forth in claim 16, which further comprises adhering said inner face and outer face sheet via an adhesive to said core and curing said adhesive at a temperature of 350° F. to 450° F.

18. A method of forming a noise reduction panel which consists of an inner face sheet, a honey comb core, an outer face sheet and an adhesive sheet positioned between at least one said inner and outer face sheets and said honey comb core, which comprises:
    adhering said inner face and outer face sheets to opposite sides of said honey comb core via said adhesive sheet; and
    forming a plurality of perforations in said inner sheets so as to have an open area of 28-38%.

19. A method of forming a noise reduction panel as set forth in claim 18, wherein said step of forming said plurality of perforations further comprises forming perforations in said inner face sheet of a density of 72 holes per square inch and wherein each of said perforations are of a diameter of 1/16 inch.

* * * * *